(12) United States Patent
Saiki et al.

(10) Patent No.: US 7,209,196 B2
(45) Date of Patent: Apr. 24, 2007

(54) TRANSPARENT PROTECTIVE FILM FOR POLARIZING PLATE, PROCESS FOR PRODUCING THE SAME, POLARIZING PLATE, AND OPTICAL FILM AND LIQUID CRYSTAL DISPLAY USING POLARIZING PLATE

(75) Inventors: Yuuji Saiki, Ibaraki (JP); Kazuki Tsuchimoto, Ibaraki (JP); Chiaki Harada, Ibaraki (JP); Seiichi Kusumoto, Ibaraki (JP); Yasuo Fujimura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 38 days.

(21) Appl. No.: 10/131,565

(22) Filed: Apr. 23, 2002

(65) Prior Publication Data

US 2002/0186461 A1    Dec. 12, 2002

(30) Foreign Application Priority Data

May 28, 2001  (JP) ............................. 2001-158133
Jun. 7, 2001  (JP) ............................. 2001-171881

(51) Int. Cl.
*G02F 1/1335*   (2006.01)
*G02F 1/1333*   (2006.01)

(52) U.S. Cl. ......................................... 349/96; 349/122
(58) Field of Classification Search ............ 349/96–98, 349/122
See application file for complete search history.

(56) References Cited

U.S. PATENT DOCUMENTS

| 4,808,468 | A | * | 2/1989 | Nojiri et al. ................. 428/220 |
| 6,068,794 | A |   | 5/2000 | Kobayashi et al. .......... 252/585 |
| 6,413,641 | B1 | * | 7/2002 | Yamasaki et al. ........... 428/412 |
| 6,507,379 | B1 | * | 1/2003 | Yokoyama et al. ........... 349/69 |
| 6,512,562 | B1 | * | 1/2003 | Kobayashi et al. .......... 349/122 |

* cited by examiner

*Primary Examiner*—Dung T. Nguyen
(74) *Attorney, Agent, or Firm*—Westerman, Hattori, Daniels & Adrian LLP

(57) ABSTRACT

A transparent protective film for polarizing plate being provided via an adhesive layer on at least one surface of a polarizer, wherein a ratio of constituent elements (oxygen ratio/carbon ratio) on the polarizer-adhering surface of the transparent protective film for polarizing plate, which is determined by X-ray photoelectron spectrometry, is larger than 0.75 has facilitate adhesion surface and no deformation without problems attributable to saponification.

21 Claims, 1 Drawing Sheet

TRANSPARENT PROTECTIVE FILM FOR POLARIZING PLATE, PROCESS FOR PRODUCING THE SAME, POLARIZING PLATE, AND OPTICAL FILM AND LIQUID CRYSTAL DISPLAY USING POLARIZING PLATE

BACKGROUND OF THE INVENTION

1. Field of the Invention

The present invention relates to a transparent protective film for polarizing plate and a process for producing the same. Further, the present invention relates to a polarizing plate using the transparent protective film for polarizing plate. The polarizing plate of the invention can be used independently or as an optical film laminating the plate and form a visual display, such as a liquid crystal display, an organic EL display or PDP.

2. Description of the Related Art

In a liquid crystal display, it is indispensable that polarizers should be arranged at both sides of a glass substrate that forms a top surface of a liquid crystal panel according to a picture formation method. Generally, polarizing plate laminating a polarizer, comprising a polyvinyl alcohol derived film and a dichroism substance such as iodine, and a transparent protective film such as triacetyl cellulose film is used.

The adhesion between the triacetyl cellulose film used as the transparent protective film and the polyvinyl alcohol derived film used as the polarizer is not good. Therefore, in order to improve its adhesion the surface of the triacetyl cellulose film used is saponified by dipping the film in an alkali solution. However, since the alkali solution at high concentration is used, the saponification can be dangerous and easily causes troubles such as breakdown on the facilities with large word load. Further, when the saponification is conducted for a long time, the concentration of the alkali solution is reduced and the effect of the saponification on improvement of adhesion may be inadequate. There is a further problem that disposal of the waste alkali solution generates a large amount of wastewater.

In place of the saponification of the surface of the transparent protective film, the film may be subjected to irradiation with UV rays from a low-pressure mercury lamp etc., whereby the surface thereof can be rendered hydrophilic to facilitate adhesion thereof to a polarizer. However, when such irradiation with UV rays is conducted at low power output, the treatment of facilitating adhesion cannot be effected in a short time, and a long time is required until the treatment of facilitating adhesion is completed. On the other hand, when the film is subjected to irradiation with UV rays at high power output for reducing the irradiation time, the film may be deformed by heating, or a plasticizer contained in the film is segregated on the surface by heating to prevent the surface being rendered hydrophilic, thus failing to make the surface sufficiently adherent.

SUMMARY OF THE INVENTION

An object of the present invention is to provide a transparent protective film for polarizing plate without problems attributable to saponification.

Another object of the present invention is to provide a process for producing a transparent protective film for polarizing plate without problems attributable to saponification. In particular, in a case the film is subjected to irradiation with UV rays at high power output from a low-pressure mercury lamp etc., the present invention is to provide a process wherein the film having facilitate adhesion surface and no deformation is obtained.

A further object of the present invention is to provide a polarizing plate using the transparent protective film for polarizing plate. A still further object of the present invention is to provide an optical film and a visual display comprising the polarizing plate laminated therein.

The present inventors devoted extensive study for solving the problem described above and consequently found that the objects described above can be achieved by using the transparent protective film described below, thus arriving at completion of the present invention. That is, the present invention is as follows:

1. A transparent protective film for polarizing plate being provided via an adhesive layer on at least one surface of a polarizer, wherein a ratio of constituent elements (oxygen ratio/carbon ratio) on the polarizer-adhering surface of the transparent protective film for polarizing plate, which is determined by X-ray photoelectron spectrometry, is larger than 0.75.

2. The transparent protective film for polarizing plate according to above-mentioned 1, wherein the transparent protective film for polarizing plate is a triacetyl cellulose film.

3. A process for producing the transparent protective film for polarizing plate being provided via an adhesive layer on at least one surface of a polarizer according to above-mentioned 1 or 2, comprising: irradiating the polarizing-adhering surface of the transparent protective film for polarizing plate with UV rays at wavelengths of 200 nm or less.

4. The process for producing the transparent protective film for polarizing plate being provided via an adhesive layer on at least one surface of a polarizer according to above-mentioned 3, comprising: irradiating the polarizing-adhering surface of the transparent protective film for polarizing plate with UV rays at wavelengths of 200 nm or less and 200 to 400 nm.

5. The process for producing the transparent protective film for polarizing plate according to above-mentioned 4, comprising: irradiating the polarizing-adhering surface of the transparent protective film for polarizing plate with UV rays while cooling the film.

6. A process for producing the transparent protective film for polarizing plate being provided via an adhesive layer on at least one surface of a polarizer according to above-mentioned 1 or 2, comprising: ozonizing the polarizing-adhering surface of the transparent protective film for polarizing plate.

7. A polarizing plate comprising a polarizer and the transparent protective film for polarizing plate according to above-mentioned 1 or 2 being provided via an adhesive layer on at least one surface of the polarizer.

8. An optical film comprising at least one sheet of the polarizing plate according to above-mentioned 7.

9. A visual display using the polarizing plate according to above-mentioned 7 or the optical film according to above-mentioned 8.

The present invention found that a surface of the transparent protective film for polarizing plate having a ratio of constituent elements (oxygen ratio/carbon ratio), which is determined by X-ray photoelectron spectrometry, larger than 0.75 has a high oxygen ratio in the surface thereby conferring hydrophilicity thereon to improve the effect of anchoring to a hydrophilic polarizer, which is obtainable by being subjected irradiation with UV rays at wavelengths of 200 nm or less or by ozonization in place of saponification. In particular, it is preferable that the ratio of constituent elements (oxygen ratio/carbon ratio) of the surface of the transparent protective film for polarizing plate is larger than 0.78. On the other hand, the ratio of constituent elements (oxygen ratio/carbon ratio) is too high, the transparent protective film may be deteriorated, and thus the ratio of constituent elements (oxygen ratio/carbon ratio) is preferably less than 0.9.

In the case of irradiation with UV rays at wavelengths of 200 nm or less and 200 to 400 nm to facilitate the film adherent, the irradiation with UV rays is conducted under cooling thereby preventing deformation of the film even upon irradiation with UV rays at high power output and simultaneously rendering the surface thereof hydrophilic in a short time without segregation of a plasticizer thereon, to give a good adherent surface.

DESCRIPTION OF THE PREFERRED EXAMPLE

Figure 1:
FIG. 1 shows the transparent protective film for polarizing plate according to the present invention.
Figure 2:
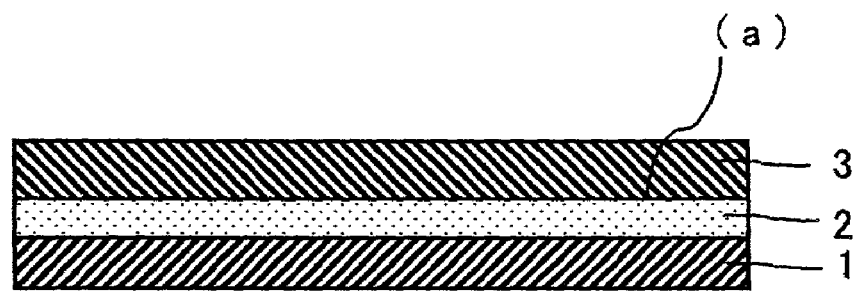
FIG. 2 shows the polarizing plate according to the present invention.

As shown in FIG. 1, the surface, adhering to the polarizer 1, of the transparent protective film for polarizing plate 3 of the present invention is the treated surface (a), which was subjected to irradiation with UV rays or ozonization. In the polarizing plate of the present invention as shown in FIG. 2, the treated surface (a) of the transparent protective film 3 shown in FIG. 1 is arranged via the adhesive layer 2 on at least one side of the polarizer 1. In FIG. 2, the transparent protective film 3 is provided on one side of the polarizer 1, but the transparent protective film 3 may be provided on both sides of the polarizer 1.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared in one side or both sides of the above-mentioned polarizer, with outstanding transparency, mechanical strength, heat stability, moisture cover property, isotropy, etc. may be preferable. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type type may be mentioned.

Generally, thickness of the transparent protective film is no more than 500 µm, preferably 1 to 300 µm and more preferably 5 to 200 µm.

As a transparent protective film, cellulose type polymers, such as triacetyl cellulose, is preferable by reason of polarization characteristics and durability etc. Especially triacetyl cellulose film is preferable. In addition, when transparent protective film is prepared on both sides of the polarizer, the transparent protective film consisting of the same polymer material may be used on the front and the backside, or the transparent protective films consisting of different polymer materials etc. may be used.

The ratio of constituent elements (oxygen ratio/carbon ratio) in the surface, adhering to a polarizer of the transparent protective film is larger than 0.75. The transparent protective film can have the surface by generating and decomposing ozone by irradiation with UV rays at wavelengths of 200 nm or less or by ozonization. In the case of irradiation with UV rays at wavelengths of 200 nm or less, the surface of the film may be treated by irradiation with UV rays at wavelengths of 200 nm or less and 200 to 400 nm. UV rays at wavelengths of 200 nm or less react with oxygen in the air to generate ozone, and ozone is decomposed by UV rays at wavelengths of 200 to 400 nm to generate active oxygen (O).

The method of irradiation with UV rays at wavelengths of 200 nm or less includes a method of using a low-pressure mercury lamp or a method of using a xenon excimer lamp.

In case of the low-pressure mercury lamp, UV rays at wavelengths of 185 nm and 254 nm are irradiated, and the UV rays at 185 nm react with oxygen in the air to generate ozone, and the ozone is decomposed by the UV rays at wavelengths of 254 nm to generate active oxygen (O) Simultaneously, chemical bonds on the surface of the transparent protective film are broken by the UV rays at 185 nm and 254 nm and react with active oxygen to increase the oxygen ratio on the surface thereby rendering the surface hydrophilic. In irradiation with UV rays, the distance between the low-pressure mercury lamp and the transparent protective film is preferably about 2 to 100 mm, more preferably 10 to 80 mm, and the concentration of ozone generated is adjusted preferably at about 10 to 500 ppm, more preferably 50 to 400 ppm. The low-pressure mercury lamp used may be selected from various lamps ranging with a low power output of about 25 W to with a high power output of about 350 W. Preferably, the treatment time is about 3 to 30 minutes, more preferably 5 to 20 minutes in the case of the low-power lamp, or about 30 to 300 seconds, more preferably 40 to 100 seconds in the case of the high-power lamp.

To reduce the treatment time with UV rays, a low-pressure mercury lamp with high power output is preferably used. In particular, a high power of 100 W or more is effective. In case of the low-pressure mercury lamp with high power output is used, the irradiation to the transparent protective film with UV rays is conducted preferably under cooling thereby preventing occurrence of inconveniences such as the deformation of the transparent protective film caused by strong heating from the lamp. The cooling temperature is 20° C. or less, preferably 15° C. or less, more preferably 10° C. or less. Cooling can be conducted by a method of placing the transparent protective film on a cooling board and the like, a method of placing the transparent protective film on a cooling roll, a method of spraying the cooling air to the film, or the like.

In case of the xenon excimer lamp, UV rays at a wavelength of 172 nm is irradiated to react with oxygen in the air to generate ozone that is then decomposed to generate active oxygen (O). Simultaneously, chemical bonds in the surface of the transparent protective film are broken by the UV rays at 172 nm and react with the active oxygen to increase the oxygen ratio in the surface thereby rendering the surface hydrophilic For treatment with UV rays, the distance between the xenon excimer lamp and the transparent protective film is preferably about 0.5 to 5 mm, more preferably 1 to 4 mm, and the concentration of ozone generated is adjusted preferably at about 10 to 1000 ppm, more preferably 20 to 800 ppm. The xenon excimer lamp uses UV rays at shorter wavelengths than those from the low-pressure mercury lamp, thus causing decomposition of the protective film more easily, so irradiation is conducted preferably in a shorter time. Depending on the power output of the xenon excimer lamp, the treatment time is preferably about 10 to 60 seconds, more preferably 15 to 50 seconds.

Besides the treatment by irradiation with UV rays at wavelengths of 200 nm or less, ozonization can be conducted by generating ozone from an ozone generator etc., then decomposing the ozone by a high-pressure mercury lamp etc. in an atmosphere where the ozone is adjusted at a concentration of about 10 to 500 ppm, to generate active oxygen (O), and simultaneously breaking chemical bonds on the surface of the transparent protective film, to permit the broken bonds to react with the active oxygen to increase the oxygen ratio in the surface thereby rendering the surface hydrophilic.

As the opposite side of the polarizing-adhering surface above-mentioned transparent protective film (non-irradiating side), a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

For treating the transparent protective film to allow it adhere to the polarizer, various aqueous adhesives can be used. Examples of such aqueous adhesives include polyvinyl alcohol type adhesives, gelatin type adhesives, vinyl latex type, aqueous polyurethane, aqueous polyesters and the like. These adhesives are used usually in the form of aqueous solutions thereof.

The adhesive includes a water-soluble crosslinking agent, whereby gel strength can be increased to improve adhesion. The polyvinyl alcohol type adhesives can contain water-soluble crosslinking agents such as boric acid, borax, glutaraldehyde, melamine and oxalic acid. Since gelatin is an amphoteric electrolyte containing hydrolyzates of a collagen protein, the gelatin type adhesives can contain water-soluble crosslinking agents having functional groups reacting with amino groups or carboxyl groups. Examples thereof includes aldehyde compounds such as formaldehyde, glutaraldehyde and glyoxal, amino compounds such as melamine, carboxyl compounds such as oxalic acid, ketones, quinones, and metals such as ferric metals of chromium and aluminum. The amount of the water-soluble crosslinking agent added is not particularly limited, generally is 40 parts by weight or less relative to 100 parts by weight of the solid content of main materials such as gelatin and polyvinyl alcohol. Preferably, the amount thereof is 0.5 to 30 parts by weight. Further, the pH value of the adhesive can be changed to allow progress of crosslinking. For preparation of an aqueous solution of the adhesive, additives including preservatives such as formic acid, phenol, salicylic acid and benzaldehyde can be incorporated into the adhesive if necessary.

The polarizing plate of the present invention is produced by laminating the polarizer via the adhesive on that surface of the transparent protective film that treated with UV rays etc. The adhesive may be applied onto the transparent protective film and/or the polarizer. After lamination, the aqueous solution of the adhesive is dried to form a dry adhesive coating layer. A roll laminator and the like can conduct the lamination of the polarizer and the transparent protective film. The thickness of the adhesive layer is not particularly limited, generally is about 0.05 to 5 μm.

When the adhesive used is a gelatin type adhesive, the adhesive is applied and then gelled to form an adhesive layer via which the transparent protective layer is laminated on the polarizer. Since gelatin is uniformly melted at high temperatures and gelled upon cooling, the gelatin type adhesive is applied at high temperatures and then gelled by cooling, whereby the squeeze-out of the adhesive, and thus the pollution of the polarizing plate and production units with the adhesive, can be prevented. The gelatin type adhesive is applied in such a state that gelatin is melted uniformly as an aqueous solution. Usually, the gelling temperature of the aqueous gelatin solution is varied depending on the concentration of the aqueous gelatin solution, additives and the like, but is usually 20 to 30° C. Accordingly, it is preferable for application of the gelatin type adhesive that the gelatin type adhesive is heated to a higher temperature than 30° C. and applied in a uniformly molten state. The adhesive is heated more preferably to a temperature of 40 to 60° C. At too high temperatures, gelatin maybe decomposed, and thus application thereof at a temperature of 60° C. or less is preferable. After application of the gelatin type adhesive, the adhesive is gelled by cooling from the high temperature to low temperature. The gelling temperature of the gelatin type adhesive is a temperature of lower than the gelling temperature of the aqueous gelatin solution. The gelling temperature is preferably 20° C. or less, more preferably 5 to 15° C.

The polarizing plate of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness maybe controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, polymethyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriection-ally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, the constitution and effect of the present invention are described in more detail by reference to the Examples. In the Examples, parts and % are expressed on a weight basis.

Example 1

(Preparation of a Polarizer)

A polyvinyl alcohol film of 80 µm in thickness was dying in 0.3% aqueous iodine, stretched 5 times in 4% aqueous boric acid and 2% aqueous potassium iodide, and then dried at 50° C. for 4 minutes to give a polarizer.

(Preparation of a Transparent Protective Film)

One side of a triacetyl cellulose film of 80 µm in thickness (referred to hereinafter as TAC film) was irradiated for 10 minutes with UV rays using a 35 W low-pressure mercury lamp. At the irradiation, the distance between the lamp and the TAC film was 55 mm, and the concentration of ozone was 200 ppm.

(Preparation of Polarizing Plate)

The UV-irradiated surface of the transparent protective film was coated with a polyvinyl alcohol type adhesive, and the film was laminated via the adhesive on both sides of the polarizer by a roll laminator, and dried at 60° C. for 4 minutes to form polarizing plate. The thickness of the adhesive layer was 0.1 µm.

Example 2

The polarizer-adhering surface of a transparent protective film was treated in the same manner as in Example 1 except that in (Preparation of a transparent protective film) Example 1, the film was irradiated for 40 seconds with UV rays from a xenon excimer lamp. Using the resultant transparent protective film, polarizing plate was obtained according to (Preparation of polarizing plate) Example 1.

Example 3

(Preparation of a Transparent Protective Film)

A TAC film of 80 µm in thickness was placed on a cooling board previously cooled at 10° C., and one side of the film was irradiated for 2 minutes with UV rays from a 350 W low-pressure mercury lamp. At the irradiation, the distance between the lamp and the TAC film was 55 mm, and the concentration of ozone was 100 ppm.

(Preparation of Polarizing Plate)

Using the resultant transparent protective film, polarizing plate was obtained according to (Preparation of Polarizing plate) Example 1.

Comparative Example 1

Polarizing plate was prepared in the same manner as in (Preparation of Polarizing plate) Example 1 except that in (Preparation of Polarizing plate) Example 1, a TAC film not irradiated with UV rays was used as the transparent protective film.

Comparative Example 2

Polarizing plate was prepared in the same manner as in (Preparation of Polarizing plate) Example 1 except that in (Preparation of Polarizing plate) Example 1, a TAC film saponified with 10% aqueous sodium hydroxide was used as the transparent protective film.

Comparative Example 3

The polarizer-adhering surface of a transparent protective film was treated in the same manner as in Example 3 except that in (Preparation of a transparent protective film) Example 3, the TAC film was irradiated without cooling with UV rays for 2 minutes from a 25 W low-pressure mercury lamp. Using the resultant transparent protective film, polarizing plate was formed according to (Preparation of Polarizing plate) Example 1.

Comparative Example 4

The polarizer-adhering surface of a transparent protective film was treated in the same manner as in Example 3 except that in (Preparation of a transparent protective film) Example 3, the TAC film was not cooled. Using the resultant transparent protective film, polarizing plate was formed according to (Preparation of Polarizing plate) Example 1.

The used transparent protective film and prepared polarizing plate in each of the Examples and Comparative Examples were evaluated as follows. The results are shown in Table 1.

(A Ratio of Constituent Elements (Oxygen Ratio)/Carbon Ratio) in the Polarizer-Adhering Surface of the Transparent Protective Film)

The polarizer-adhering surface of the transparent protective film (TAC film) used in each of the Examples and Comparative Examples was measured at an X-ray power of 150 W at a photoelectron removal angle of 90° C. with an X-ray photoelectron spectrometer (Kratos AXIS-HSi, Shimadzu Corporation), and the ratio of constituent elements was calculated to determine (oxygen ratio/carbon ratio).

(Deformation of TAC Film)

Whether the transparent protective film was deformed or not was judged during preparation of the film. When at least 3% of the dimension of the film had been changed, the film was regarded as being deformed.

(Measurement of the Contact Angle of the Polarizer-Adhering Surface of the Transparent Protective Film)

The polarizer-adhering surface of the transparent protective film (TAC film) used in each of the Examples and Comparative Examples was examined for its contact angle with water. Measurement of the contact angle was conducted by a droplet method. When the contact angle is 40° or less, it can be judged that the surface has been rendered hydrophilic. In particular, the contact angle is preferably 25° or less.

(Adhesion)

The polarizing plate obtained in each of the Examples and Comparative Examples was cut into pieces each having a width of 25 mm, and then extended with a tension speed of 300 mm/min. at room temperature (25° C.) at a peel angle of 180° with a tensile tester, to separate the TAC film from the polarizing plate. Polarizing plate broken without separation of the TAC film was expressed as "broken". The results are shown in Table 1.

TABLE 1

| | Oxygen ratio/ carbon ratio | Film deformation | Contact angle | Adhesion |
| --- | --- | --- | --- | --- |
| Example 1 | 0.81 | not deformed | 7° | broken |
| Example 2 | 0.80 | not deformed | 7° | broken |
| Example 3 | 0.81 | not deformed | 10° | broken |
| Comparative Example 1 | 0.64 | not deformed | 60° | 0.01N/25 mm |
| Comparative Example 2 | 0.72 | not deformed | 17° | broken |

TABLE 1-continued

| | Oxygen ratio/ carbon ratio | Film deformation | Contact angle | Adhesion |
|---|---|---|---|---|
| Comparative Example 3 | 0.67 | not deformed | 55° | 0.01N/25 mm |
| Comparative Example 4 | 0.70 | deformed | 55° | 0.02N/25 mm |

As shown Table 1, it can be recognized that by irradiation of the polarizer-adhering surface of the transparent protective film with UV rays at wavelengths of 200 nm or less, the ratio of constituent elements (oxygen ratio/carbon ratio) on the surface of the triacetyl cellulose film is made larger than 0.75 as determined by X-ray photoelectron spectrometry, and the adhesion of the surface is thereby improved.

It is further found that when the triacetyl cellulose film is irradiated under cooling with UV rays at wavelengths of 185 nm and 254 nm from a low-pressure mercury lamp with high power output, the film can be rendered hydrophilic in a short time without deformation, to improve adhesion to the polarizer.

What is claimed is:

1. A transparent protective film for polarizing plate being provided via an adhesive layer on at least one surface of a polarizer,
wherein the transparent protective film for polarizing plate is a triacetyl cellulose film and a ratio of constituent elements (measured molar ratio of oxygen on the polarizer-adhering surface /measured molar ratio of carbon on the polarizer-adhering surface) of the transparent protective film for polarizing plate, which is determined by X-ray photoelectron spectrometry, is larger than 0.78.

2. A polarizing plate comprising a polarizer and the transparent protective film for polarizing plate according to claim 1 being provided via an adhesive layer on at least one surface of the polarizer.

3. The polarizing plate according to claim 2, wherein the adhesive layer comprises polyvinyl alcohol.

4. An optical film comprising at least one sheet of the polarizing plate according to claim 2.

5. A visual display comprising the optical film of claim 4.

6. The visual display of claim 5, which is a liquid crystal display.

7. The visual display of claim 5, which is an electroluminescent display.

8. A visual display comprising the polarizing plate according to claim 4.

9. The visual display of claim 8, which is a liquid crystal display.

10. The visual display of claim 8, which is an electroluminescent display.

11. An optical film comprising two or more sheets of the polarizing plate according to claim 2.

12. A visual display comprising the optical film of claim 11.

13. The visual display of claim 12, which is a liquid crystal display.

14. The visual display of claim 12, which is an electroluminescent display.

15. The transparent protective film for polarizing plate according to claim 1, wherein the ratio of constituent elements is less than 0.9.

16. The transparent protective film for polarizing plate according to claim 1, wherein the ratio of constituent elements is larger than 0.80.

17. The transparent protective film for polarizing plate according to claim 1, wherein the ratio of constituent elements is larger than 0.81.

18. The transparent protective film for polarizing plate according to claim 1, wherein the polarizer-adhering surface of the transparent protective film has a contact angle of 40 degrees or less.

19. The transparent protective film for polarizing plate according to claim 1, wherein the polarizer-adhering surface of the transparent protective film has a contact angle of 25 degrees or less.

20. The transparent protective film for polarizing plate according to claim 1, wherein the polarizer-adhering surface of the transparent protective film has a contact angle of 10 degrees or less.

21. The transparent protective film for polarizing plate according to claim 1, wherein the polarizer-adhering surface of the transparent protective film has a contact angle of 7 degrees or less.

* * * * *